(12) United States Patent
Takemoto et al.

(10) Patent No.: US 10,844,768 B2
(45) Date of Patent: Nov. 24, 2020

(54) ABNORMALITY DETERMINATION DEVICE

(71) Applicant: DENSO CORPORATION, Kariya (JP)

(72) Inventors: Eiji Takemoto, Kariya (JP); Tomomi Oshima, Kariya (JP)

(73) Assignee: DENSO CORPORATION, Kariya (JP)

(*) Notice: Subject to any disclaimer, the term of this patent is extended or adjusted under 35 U.S.C. 154(b) by 35 days.

(21) Appl. No.: 16/218,723

(22) Filed: Dec. 13, 2018

(65) Prior Publication Data

US 2019/0186328 A1 Jun. 20, 2019

(30) Foreign Application Priority Data

Dec. 18, 2017 (JP) ................................. 2017-242233

(51) Int. Cl.
*F01N 11/00* (2006.01)
*F01N 3/20* (2006.01)
*F01N 9/00* (2006.01)

(52) U.S. Cl.
CPC ............ *F01N 11/002* (2013.01); *F01N 3/208* (2013.01); *F01N 9/00* (2013.01); *F01N 2560/08* (2013.01); *F01N 2610/02* (2013.01); *F01N 2610/144* (2013.01); *F01N 2610/146* (2013.01); *F01N 2900/0418* (2013.01); *F01N 2900/1808* (2013.01); *F01N 2900/1821* (2013.01); *F01N 2900/1822* (2013.01)

(58) Field of Classification Search
CPC combination set(s) only.
See application file for complete search history.

(56) References Cited

U.S. PATENT DOCUMENTS

| | | | |
|---|---|---|---|
| 2010/0071349 A1* | 3/2010 | Kitazawa | F01N 3/2066 60/277 |
| 2012/0324865 A1* | 12/2012 | Habumuremyi | F01N 3/208 60/274 |
| 2013/0283771 A1 | 10/2013 | Nagata | |
| 2014/0352280 A1* | 12/2014 | Qi | F01N 3/2066 60/274 |
| 2017/0167340 A1* | 6/2017 | Englert | F01N 3/208 |
| 2017/0241315 A1* | 8/2017 | Shirasawa | F01N 3/208 |
| 2018/0230880 A1* | 8/2018 | Evans | F01N 9/00 |
| 2018/0363524 A1* | 12/2018 | Kimura | F01N 3/0814 |

* cited by examiner

*Primary Examiner* — Binh Q Tran
(74) *Attorney, Agent, or Firm* — Nixon & Vanderhye P.C.

(57) ABSTRACT

An abnormality determination device is used in an exhaust gas purification system. The exhaust gas purification system is disposed in an exhaust gas passage of an internal-combustion engine and includes an injection valve for injecting a liquid reducing agent to a $NO_x$ purification catalyst for purifying $NO_x$ in an exhaust gas, and a pump for pressurizing and supplying the reducing agent to the injection valve via a reducing agent passage. The abnormality determination device includes an acquisition section acquiring a rotation speed of the pump when the injection valve is injecting the reducing agent as an injection time rotation speed; and a determiner determining whether the injection valve has an abnormality based on the injection time rotation speed.

13 Claims, 7 Drawing Sheets

ABNORMALITY DETERMINATION DEVICE

CROSS REFERENCE TO RELATED APPLICATION

The present application is based on and claims the benefit of priority of Japanese Patent Application No. 2017-242233, filed on Dec. 18, 2017, the disclosure of which is incorporated herein by reference.

TECHNICAL FIELD

The present disclosure generally relates to an abnormality determination device for detecting abnormalities in an injection valve in an exhaust gas purification system that includes a pump and an injection valve.

BACKGROUND INFORMATION

In recent years, a urea SCR (selective catalytic reduction) system has been developed and mass-produced as an exhaust gas purification system for purifying $NO_x$ (i.e., nitrogen oxides) in the exhaust gases of vehicle engines at a high purification rate, especially in diesel engines.

The urea SCR system includes (i) a pump for pumping an aqueous urea solution stored in a tank under pressure to a reducing agent passage, and (ii) an injection valve for injecting the aqueous urea solution pumped through the reducing agent passage into an exhaust pipe of the engine. The aqueous urea solution may also be referred to as urea water and may act as a reducing agent.

In such a urea SCR system, when the operation of the injection valve is hindered by the crystallization of the urea, or due to foreign matter introduced into the injection valve from the exhaust pipe side through an injection hole of the injection valve, the injection amount of the urea water may become abnormal.

Existing abnormality determination devices for determining abnormalities in urea water injection valves may not accurately determine the presence or absence of abnormalities in the injection valve, and thus, are subject to improvement.

SUMMARY

It is an object of the present disclosure to provide an abnormality determination device capable of appropriately and accurately detecting the presence or absence of an abnormality in an injection valve.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An exhaust gas purification system 10 with a pump control unit 70 related to an abnormality determination device is described with reference to the drawings. The exhaust gas purification system 10 purifies $NO_x$ in the exhaust gas by using a selective reduction type catalyst (i.e., an SCR catalyst), and is configured as a urea SCR system. The exhaust gas purification system 10 is applicable to various types of vehicles having a diesel engine 30 as an internal-combustion engine. The diesel engine 30 may be referred to simply as the engine 30. The exhaust gas purification system 10 may also be applied to construction machines such as crane vehicles, agricultural machines such as tractors, and the like.

Figure 1:
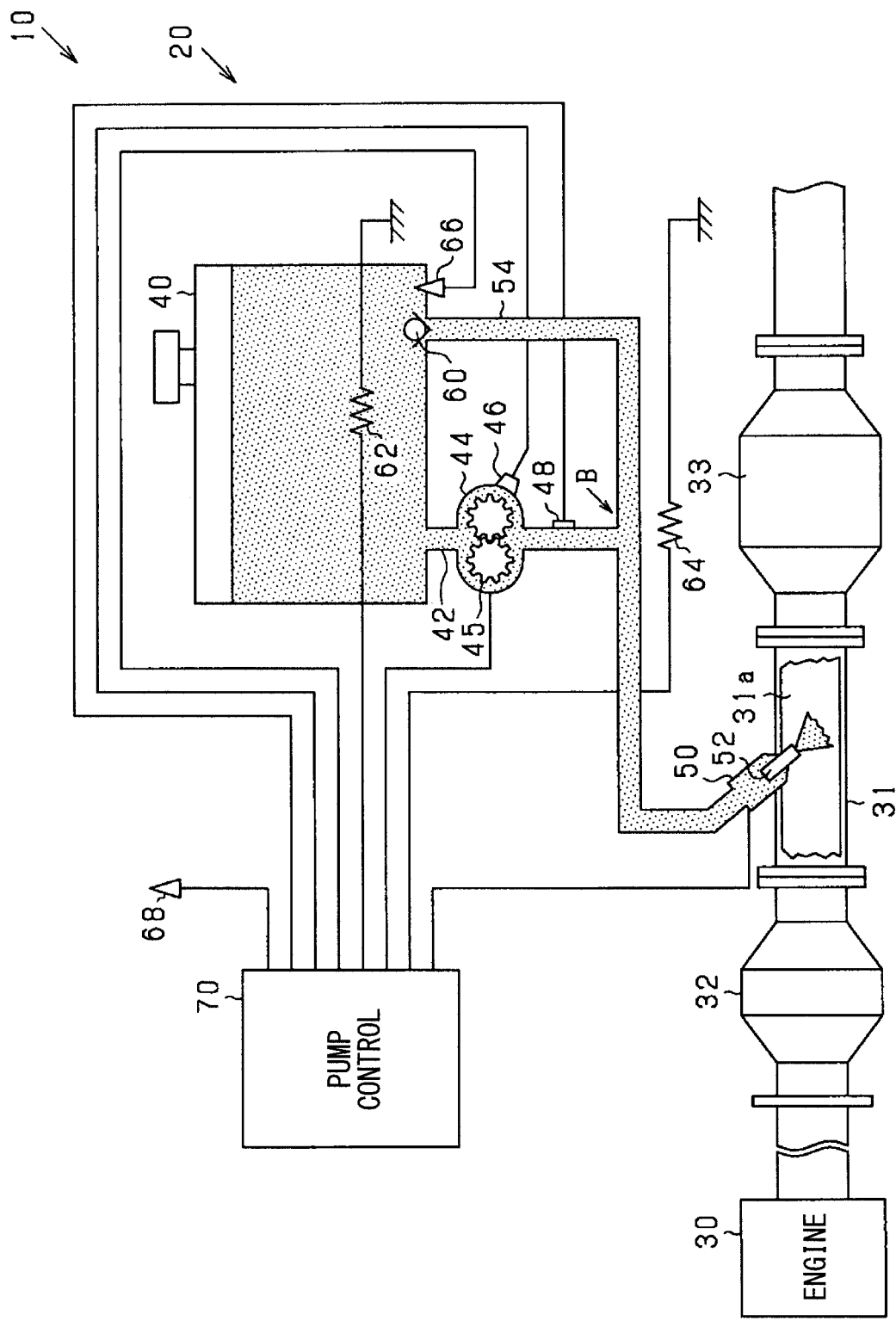
FIG. 1 is a schematic diagram of an exhaust gas purification system of an engine.

As shown in FIG. 1, an engine exhaust system of the exhaust gas purification system 10 may include an exhaust pipe 31 forming an exhaust passage 31a connected to the engine 30. In the exhaust pipe 31, a DPF (diesel particulate filter) 32 and an SCR catalyst 33 are arranged sequentially on the upstream side of the engine exhaust system. Between the DPF 32 and the SCR catalyst 33 in the exhaust pipe 31, a urea water injection valve 50 is disposed that injects an aqueous urea solution (i.e., urea water) as a liquid reducing agent into the exhaust passage 31a. The urea water injection valve 50 may be referred to simply as the injection valve 50. The injection valve 50 is attached to the exhaust pipe 31, with only a tip part positioned in the pipe 31 to avoid the influence of heat from high temperature exhaust gases on the injection valve 50 as much as possible. For example, the exhaust gases may be at temperatures around 600° C. In the present embodiment, the SCR catalyst 33 may also be referred to as a "$NO_x$ purification catalyst."

The DPF 32 is a particulate matter (PM) removing filter for trapping PM in the exhaust gas. The DPF 32 carries a platinum-based oxidation catalyst and removes hydrocarbons (HC) and carbon monoxide (CO) together with a soluble organic fraction (SOF) as PM components. The PM trapped in the DPF 32 is burned and removed post injection, that is, after the main fuel injection in the engine 30, and in such manner the DPF 32 may be continuously used.

The SCR catalyst 33 promotes the reduction reaction of $NO_x$ (e.g., an exhaust gas purification reaction), such as $$4NO+4NH_3+O_2 \rightarrow 4N_2+6H_2O \quad \text{(Equation 1)}$$

$$6NO_2+8NH_3 \rightarrow 7N_2+12H_2O \quad \text{(Equation 2)}$$

$$NO+NO_2+2NH_3 \rightarrow 2N_2+3H_2O \quad \text{(Equation 3)}$$

for purifying $NO_x$ in the exhaust gas. The injection valve 50 provided on the upstream side of the SCR catalyst 33 is a device for injecting urea water to generate ammonia ($NH_3$) that serves as a reducing agent of $NO_x$ in those reactions.

An oxidation catalyst may be provided as an ammonia removing device on the downstream side of the SCR catalyst 33 in the exhaust pipe 31. The oxidation catalyst may remove surplus ammonia ($NH_3$) from the SCR catalyst.

The configuration and components of a reducing agent injection system 20 that injects urea water via the injection valve 50 in the exhaust gas purification system 10 is described next. In the following description, the urea water is supplied to the injection valve 50 from a urea water tank 40. The urea water tank 40 may be referred to simply as the tank 40. The following description assumes that the tank 40 in on an upstream side of the exhaust gas purification system 10 and the injection valve 50 is on a downstream side of the exhaust gas purification system 10.

As shown in FIG. 1, the tank 40 is a sealed container with a liquid supply cap, and a urea water of a predetermined specified concentration is stored within the tank 40. In the present embodiment, the urea concentration is 32.5%, which is a concentration level that has the lowest freezing point. When the urea concentration is 32.5%, the urea water freezes at temperatures around −11° C. or lower.

The tank 40 and the injection valve 50 are connected by a supply pipe 42. An end portion on the upstream side of the supply pipe 42 is connected to a bottom surface of the tank 40 to allow the urea water stored in the tank 40 to flow into the supply pipe 42. In the present embodiment, the supply pipe 42 may also be referred to as a "reducing agent passage."

The middle part of the supply pipe 42 includes a urea water pump 44. The urea water pump 44 may also be referred to simply as the pump 44. The pump 44 is an electric pump rotationally driven by an electric current supplied by the pump control unit 70. The pump 44 pressurizes and supplies the urea water to the injection valve 50 via the supply pipe 42.

The pump 44 has a gear 45 and supplies the urea water based on a rotation number of the gear 45. Specifically, the pump 44 is set to discharge a constant amount of urea water per rotation of the gear 45. In addition, the pump 44 is capable of rotating the gear 45 in both forward and reverse directions. Hereafter, the forward rotation of the gear 45 is referred to as a forward rotation of the pump 44, and the reverse rotation of the gear 45 is referred to as a reverse rotation of the pump 44. The urea water in the tank 40 is sucked out of the tank 40 and pumped in a downstream direction by the forward rotation of the pump 44, and the urea water is pumped back into the tank 40 by the reverse rotation of the pump 44.

The pump 44 is provided with a rotation sensor 46. The rotation sensor 46 detects a rotation speed N, which is the rotation number ΣN of the pump 44 per unit time. The rotation sensor 46 detects, for example, a urea water discharge speed by the pump 44. The urea water discharge speed may also be referred to as the pressure feed speed.

The supply pipe 42 includes a pressure sensor 48 on the downstream side of the pump 44. The pressure sensor 48 detects a pressure P in the supply pipe 42, and detects, for example, a discharge pressure of the urea water by the pump 44.

The injection valve 50 is connected at a downstream end portion of the supply pipe 42. The injection valve 50 has substantially the same configuration as an existing fuel injection valve (i.e., an injector).

The injection valve 50 is configured as an electromagnetic open-close valve including a driving part made of an electromagnetic solenoid and a valve body part having a needle 52 for opening and closing a front end injection port. The injection valve 50 is driven to open and close in response to a driving signal Sm supplied from the pump control unit 70. That is, when the electromagnetic solenoid is energized in response to the driving signal Sm, the needle 52 moves in the opening direction based on the energization, and the front end injection port is opened by the movement of the needle 52 for injecting the urea water.

The supply pipe 42 includes a branch pipe 54. The branch pipe 54 connects the tank 40 to the supply pipe 42 at a branch portion B on the downstream side of the pump 44. The pressure sensor 48 is provided in a portion of the supply pipe 42 between the pump 44 and the branch portion B.

One end of the branch pipe 54 is connected to the bottom surface of the tank 40. A check valve 60 is disposed at the end of the branch pipe 54 connected to the tank 40. The check valve 60 is closed when the pressure P in the branch pipe 54 is lower than a predetermined pressure to prevent the urea water stored in the tank 40 from flowing into the branch pipe 54. The check valve 60 opens when the pressure P in the branch pipe 54 is higher than the predetermined pressure, and allows the urea water in the branch pipe 54 to flow into the tank 40.

The tank 40 includes a heating element 62. For example, the heating element 62 is an electric heater, and thaws the urea water frozen in the tank 40 when the heating element 62 is energized based on an instruction signal from the pump control unit 70. The heating element 62 may be positioned anywhere in, on, or around the tank 40 to thaw the frozen urea water. For example, the heating element 62 may be provided near a suction port of the supply pipe 42.

On an outer periphery of the supply pipe 42, a heating element 64 is provided. For example, the heating element 64 is an electric heater and thaws the urea water frozen in the supply pipe 42 when the heating element 64 is energized based on an instruction signal from the pump control unit 70.

A temperature sensor 66 is disposed within the tank 40. For example, the temperature sensor 66 is a temperature sensitive diode or a thermistor, and measures the temperature of the urea water in the tank 40. An outside air temperature sensor 68 is provided outside the tank 40. For example, the outside air temperature sensor 68 is a temperature sensitive diode or a thermistor, which is disposed at a certain distance from the tank 40. The outside air temperature sensor 68 measures the outside air temperature around the vehicle.

The pump control unit 70 includes an ECU (Electronic Control Unit) (not shown) that controls an exhaust gas purification process. The ECU includes, for example, a microcomputer including a CPU, a ROM, a RAM, and an input/output (I/O) interface (all not shown). The pump control unit 70 can acquire the rotation speed N of the pump 44 from the rotation sensor 46, acquire the pressure P in the supply pipe 42 from the pressure sensor 48, acquire the temperature of the urea water in the tank 40 from the temperature sensor 66, and acquire the outside air temperature from the outside air temperature sensor 68. The pump control unit 70 can control the components of the reducing agent injection system 20 based on these acquired values. The pump control unit 70, specifically, the ECU of the control unit 70 may be configured to execute a program/instruction set stored in memory to perform a process or series of processes, for example, the processes shown in FIGS. 3 and 5 and described below in greater detail. More specifically, the microcomputer of the ECU of the control unit 70 may be configured to execute a program/instruction set stored in the memory (e.g., RAM, ROM) of the ECU or the microcomputer itself to perform a process or series of processes, for example, the processes shown in FIGS. 3 and 5. The memory of the microcomputer is an example of a non-transitory, substantive storage medium.

When the pump 44 rotates in the forward direction, the pump control unit 70 performs a pressure feedback control of the pump 44 (i.e., PI control), for controlling the pressure P measured by the pressure sensor 48 to match a predetermined reference pressure Po.

When the pump 44 rotates in a forward direction, the pump control unit 70 calculates a requested injection amount Qo of the injection valve 50 based on the current load and the rotation speed (see FIG. 2) of the engine 30. The pump control unit 70 generates a drive signal Sm for realizing the calculated requested injection amount Qo, and outputs the drive signal Sm to the injection valve 50. In such manner, the pump control unit 70 controls the injection amount Q of the injection valve 50.

Figure 2:
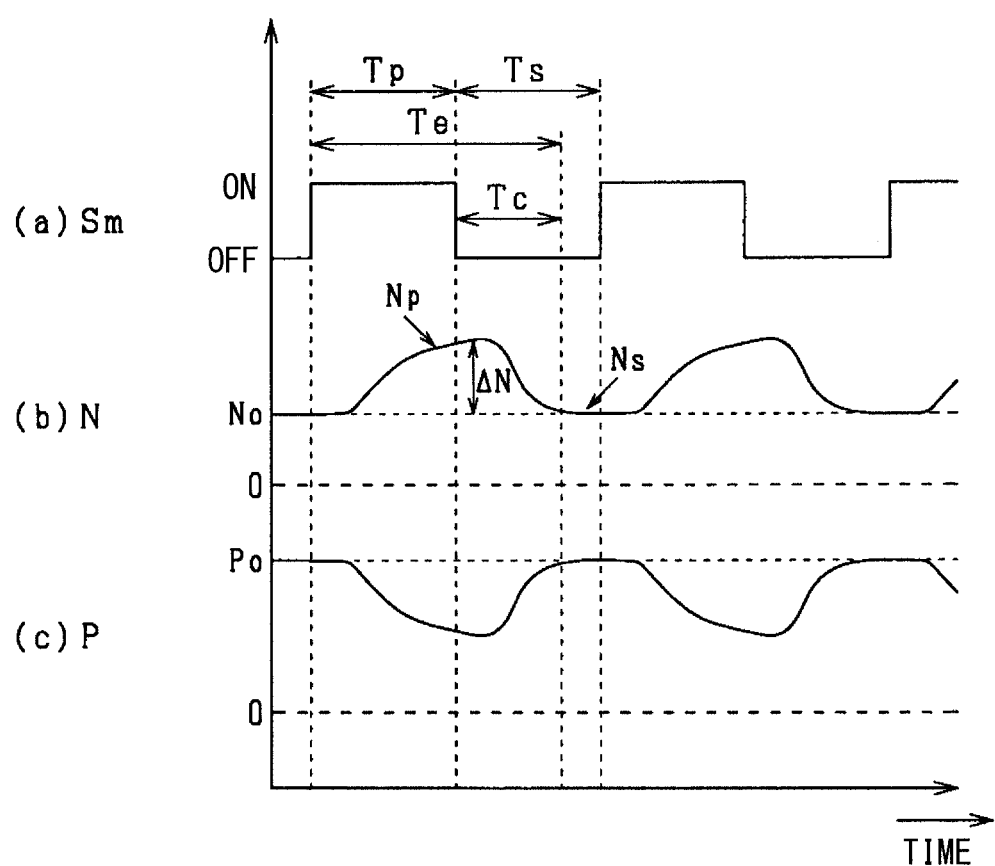
FIG. 2 is a transition diagram of a rotation speed during an injection by an injection valve.

FIG. 2 shows the transition of the rotation speed N during the injection by the injection valve 50. Part (a) of FIG. 2 shows the transition value of the drive signal Sm, part (b) of FIG. 2 shows the transition of the rotation speed N, and part (c) of FIG. 2 shows the transition of the pressure P in the supply pipe 42. In FIG. 2, pulsations that occur at times other than during the injection by the injection valve 50 have been removed from the rotation speed N and the pressure P transitions. Pulsations that occur at times other than during the injection have also been removed from the rotation speed N and the pressure P transitions in FIGS. 6, 7, 9, and 10.

As shown in FIG. 2, the drive signal Sm is a signal having two values, an ON voltage and an OFF voltage. When the drive signal Sm is an OFF voltage, the injection valve 50 is closed and the injection of the urea water by the injection valve 50 is stopped. The period during which the drive signal Sm is the OFF voltage is referred to as an injection stop period Ts. In the injection stop period Ts, the rotation speed N is controlled to a predetermined reference speed No by the pressure feedback control of the pump 44. The surplus urea water is returned to the tank 40 through the branch pipe 54.

On the other hand, when the drive signal Sm is the ON voltage, the injection valve 50 is opened, and the urea water is injected by the injection valve 50. The period during which the drive signal Sm is the ON voltage is referred to as an injection period Tp. In the injection period Tp, the pressure P in the supply pipe 42 decreases from the reference pressure Po during the injection. To compensate for the pressure decrease during the injection, the amount of urea water discharged from the pump 44 by the pressure feedback (hereafter referred to as a pump discharge amount) is increased, and accordingly the rotation speed N increases. As a result, the urea water in the tank 40 is sucked out, and the urea water is supplied to the injection valve 50. The change or increase amount of the rotation speed N from the reference speed No during the injection is referred to as ΔN.

The pump control unit 70 switches the ON voltage and the OFF voltage of the drive signal Sm at a predetermined cycle. As such, the injection valve 50 repeatedly performs the injection and an injection stop (i.e., a stop of the injection) at a predetermined cycle. In the present embodiment, the cycle of the drive signal Sm is at a frequency of 2 Hz, and the injection stop period Ts and the injection period Tp during the cycle are controlled to be of equal durations.

When the pump 44 rotates in the reverse direction, the pump control unit 70 performs a rotation speed feedback control so that the rotation speed N acquired from the rotation sensor 46 matches the predetermined rotation speed.

In the operation described above, the pump control unit 70 controls a duty ratio Du of the electric current (i.e., the pump duty ratio) supplied to the pump 44 during the forward rotation of the pump 44 to control the injection amount Q of the urea water supplied to the injection valve 50. Therefore, when an abnormality occurs in the injection amount Q due to the crystallization of the urea, the abnormality of the injection valve 50 is determinable from the pump duty ratio Du. The abnormality may be an entry of foreign matter into the injection valve 50 from the exhaust pipe 31 side through the injection hole of the injection valve.

However, due to the following reasons, it may be difficult to accurately determine the abnormality of the injection valve 50 from the pump duty ratio Du. For example, in instances where the rotation speed N of the pump 44 varies according to the injection amount Q, in the process of calculating the injection amount Q from the pump duty ratio Du, the effective value of the electric current supplied to the pump 44 is calculated from the pump duty ratio Du. Then, the rotation speed N is calculated based on the effective value of the electric current, and the injection amount Q is calculated based on this rotation speed N. That is, the injection amount Q is indirectly calculated from the pump duty ratio Du. Therefore, when an error occurs during the calculation of the effective value of the electric current from the pump duty ratio Du, or when the rotation speed N is calculated from the effective value of the electric current, it is not possible to accurately determine the abnormality of the injection valve 50.

In order to solve the above problem, the pump control unit 70 of the present embodiment performs an abnormality determination process when the pump 44 rotates in the forward direction. The abnormality determination process is a process of acquiring the rotation speed N during the injection of the urea water by the injection valve 50, and determining the presence or absence of abnormality in the injection valve 50 based on the acquired rotation speed N. Thus, it is possible to properly determine the abnormality of the injection valve 50 based on the rotation speed N.

Figure 3:
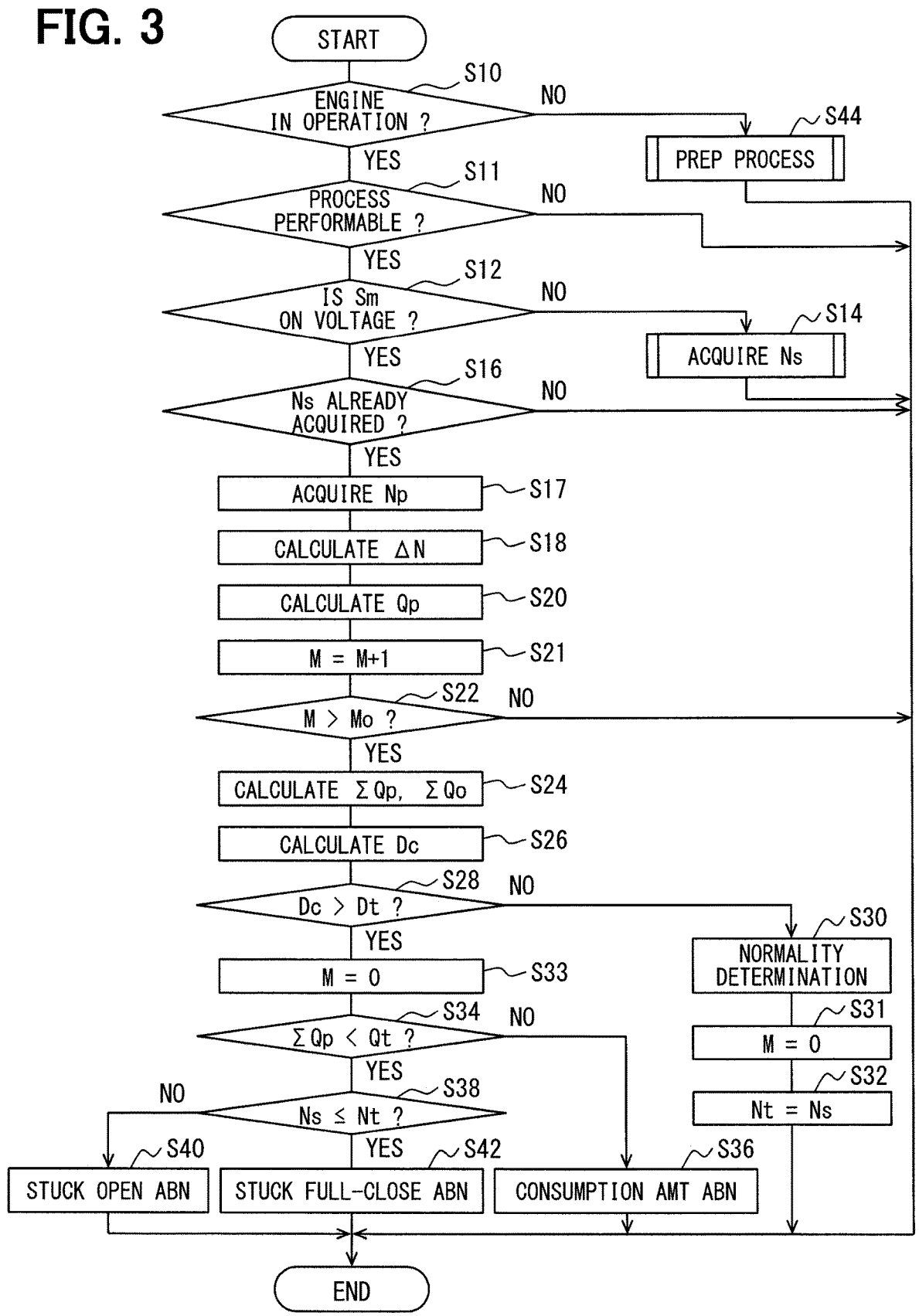
FIG. 3 is a flowchart of an abnormality determination process.

FIG. 3 shows a flowchart of the abnormality determination process performed in the present embodiment. During the operation of the engine 30, the pump control unit 70 repeatedly performs the abnormality determination process at predetermined time intervals.

When the abnormality determination process is started, at S10, the pump control unit 70 determines whether the engine 30 is in operation.

Specifically, the pump control unit 70 determines whether an ignition switch of the vehicle is in an ON state. When the pump control unit 70 makes an affirmative determination at S10, i.e., "YES," the process proceeds to S11.

At S11, the pump control unit 70 determines whether the abnormality determination process can be performed. Specifically, the pump control unit 70 determines whether rotation sensor 46, the pressure sensor 48, and the state of the pressure feedback control are respectively normal. When the pump control unit 70 makes a negative determination at S11, i.e., "NO," the pump control unit 70 ends the abnormality determination process. On the other hand, when an affirmative determination is made at S11, i.e., "YES," the process proceeds to S12.

At S12, the pump control unit 70 determines whether the drive signal Sm is the ON voltage. When the pump control unit 70 determines that the drive signal Sm is in the injection stop period Ts where the drive voltage Sm is the OFF voltage, the pump control unit 70 makes a negative determination at S12, i.e., "NO," and the process proceeds to S14.

At S14, the pump control unit 70 acquires the rotation speed N of the pump 44 by using the rotation sensor 46.

As shown in FIG. 2, when the injection valve 50 is normal, the rotation speed N in the injection stop period Ts is the reference speed No. However, the rotation speed N may differ from the reference speed No during the injection stop period Ts as a result of being affected by the immediately preceding injection. As such, when the injection valve 50 is injecting immediately before the target injection stop period Ts, the pump control unit 70 acquires the reference speed No in the injection period Ts after a predetermined amount of time Tc (i.e., period Tc) has lapsed after the start of the injection stop period Ts. The rotation speed N acquired in the injection stop period Ts after the predetermined amount of time Tc has lapsed may be referred to as an injection stop speed Ns. In the present embodiment, the injection stop period Ts after the lapse of the predetermined amount of time Tc from the start of the injection stop period Ts corresponds to an "injection stop state," and the injection stop speed Ns acquired at such moment corresponds to an "no-injection time rotation speed."

On the other hand, when the pump control unit 70 determines that the drive signal Sm is in the injection period Tp where the drive signal Sm is the ON voltage, the pump control unit 70 makes an affirmative determination at S12, i.e., "YES," and the process proceeds to S16. At S16, the pump control unit 70 determines whether the injection stop speed Ns has already been acquired. When the pump control unit 70 makes a negative determination at S16, i.e., "NO," the pump control unit 70 ends the abnormality determination process. On the other hand, when an affirmative determination is made at S16, i.e., "YES," the process proceeds to S17, and the pump control unit 70 acquires the rotation speed N by using the rotation sensor 46. In the present embodiment, when the process at S17 is performed by the pump control unit 70, the pump control unit 70 may be referred to as an "acquisition section," because the pump control unit 70 acquires the rotation speed N by using the rotation sensor 46.

The pump control unit 70 acquires the rotation speed N in the injection period Tp and subsequently in the predetermined period Tc following the injection period Tp. The period that includes the injection period Tp and the subsequent, predetermined period Tc may be referred to as an acquisition period Te. The rotation speed N acquired in the acquisition period Te may be referred to as an injection speed Np. In the present embodiment, the acquisition period Te corresponds to an "injecting state," and the injection speed Np corresponds to an "injection time rotation speed."

At S18, the pump control unit 70 calculates the increase amount ΔN of the rotation speed N, i.e., the change amount ΔN. The pump control unit 70 calculates the increase amount ΔN of the rotation speed N by subtracting the injection stop speed Ns acquired at S14 from the injection speed Np acquired at S17.

The pump control unit 70 acquires the injection speed Np for every acquisition period Te, and acquires the injection stop speed Ns for every injection stop period Ts. In this case, the pump control unit 70 acquires (i) the injection stop speed Ns in the injection stop period Ts before the target acquisition period Te and (ii) the injection speed Np in the target acquisition period Te. Here, the target acquisition period Te is the acquisition period Te subsequent to the injection stop period Ts where the injection stop speed Ns is acquired. A preset condition for acquiring the injection stop speed Ns may be that the injection stop speed Ns be acquired/obtained before the injection speed Np in the subsequent target acquisition period Te. At S18, the pump control unit 70 subtracts the injection stop speed Ns in the injection stop period Ts before the target acquisition period Te from the injection speed Np in the target acquisition period Te, thereby calculating the increase amount ΔN of the rotation speed N in the target acquisition period Te.

Figure 4:
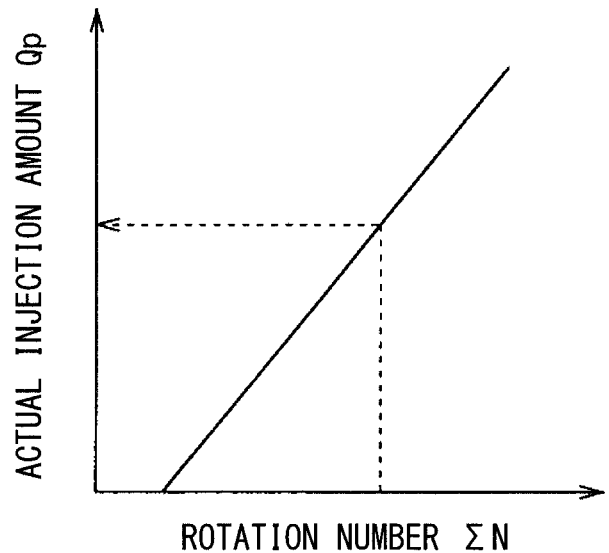
FIG. 4 is a diagram of a relationship between a rotation number and an actual injection amount by a pump.

At S20, the pump control unit 70 calculates an actual injection amount Qp from the increase amount ΔN of the rotation speed N acquired at S18. As shown in FIG. 4, a correlation diagram showing the relationship between the rotation number ΣN of the pump 44 and the actual injection amount Qp. Such a correlation may be used to make a conversion table that may be stored in the memory of the pump control unit 70. A conversion table may be a set of data for actual injection amount Qp values and their corresponding rotation numbers ΣN, and vice versa. The pump control unit 70 integrates the increase amount ΔN of the rotation speed N acquired at S18 for the duration of the target acquisition period Te to calculate the rotation speed ΣN, and uses the conversion table to convert the calculated rotation number ΣN to the actual injection amount Qp. Upon calculating the actual injection amount Qp, the pump control unit 70 increments a number M by 1 at 521, and the process then proceeds to S22. The number M indicates the number of times the actual injection amount Qp has been calculated.

At S22, the pump control unit 70 determines whether or not the number M is greater than a prescribed number Mo, where Mo is a natural number (i.e., positive integer) equal to or greater than two (i.e., Mo≥2). The prescribed number Mo is the number of acquisition periods Te for integrating the actual injection amount Qp in order to properly determine the abnormality of the injection valve 50, which is set to "100" in the present embodiment. When the pump control unit 70 makes a negative determination at S22, i.e., "NO," the pump control unit 70 ends the abnormality determination process. On the other hand, when the pump control unit 70 makes an affirmative determination at S22, i.e., "YES," the process proceeds to S24.

At S24, the pump control unit 70 calculates an integrated actual injection amount ΣQp by integrating the actual injection amount Qp in the M pieces of the acquisition period Te, and calculates an integrated requested injection amount ΣQo by integrating the requested injection amount Qo in the M pieces of the acquisition periods Te (i.e., the injection period Tp). Subsequently, at S26, the pump control unit 70 calculates a consumption amount deviation Dc, as shown in equation 4, that is an absolute value of the difference between the integrated actual injection amount ΣQp and the integrated requested injection amount ΣQo.

|ΣQp−ΣQo=Dc    (Equation 4)

At S28, the pump control unit 70 determines whether the consumption amount deviation Dc is greater than a predetermined difference threshold value Dt. The difference threshold value Dt is a threshold value for determining whether an unexpected change has occurred in the injection valve 50. Here, the unexpected change in the injection valve 50 may be a change other than an expected change due to the aging of the injection valve 50, i.e. a non-age related change. The difference threshold value Dt is set to a half of the integrated actual injection amount ΣQp calculated at S24. When the pump control unit makes a negative determination at S28, i.e., "NO," the pump control unit 70 determines that the injection valve 50 is normal at S30, and the process proceeds to S31.

At S31, the pump control unit 70 sets the number M to zero, and at S32, the pump control unit 70 updates the injection stop speed Ns used in the determination at S28. That is, the pump control unit 70 updates the injection stop speed Ns used for calculating the increase amount ΔN of the rotation speed N at S18, as a speed threshold value Nt. After the pump control unit 70 performs the update of the injection stop speed Ns at S32, the abnormality determination process ends. In the present embodiment, when the pump control unit 70 performs the process at S28, the pump control unit 70 may be referred to as a "determiner," because the pump control unit 70 is performing a determination process. When the pump control unit 70 performs the process at S32, the pump control unit 70 may be referred to as an "updater," because the pump control unit 70 is performing an update process. The updater may be part of the acquisition section. That is, the acquisition section may include the updater.

On the other hand, when the pump control unit 70 makes an affirmative determination at S28, i.e., "YES," the pump control unit 70 determines that the injection valve 50 is abnormal, and determines the type of abnormality at S34, S36, S38, S40, and S42. When the consumption amount deviation Dc is greater than the difference threshold value Dt, an abnormality may occur where the actual injection amount Qp is excessively greater than the requested injection amount Qo, or where the actual injection amount Qp is excessively smaller than the requested injection amount Qo.

When the actual injection amount Qp is excessively greater than the requested injection amount Qo, an excess of urea water relative to the amount of $NO_x$ in the exhaust gas is injected into the exhaust gas passage 31a. In other words, more urea water is injected into the exhaust gas passage 31a than what is necessary for purifying the $NO_x$ in the exhaust gas. As such, a urea precipitate from the surplus urea water in the exhaust gas passage 31a may form and accumulate in the exhaust pipe 31.

When the actual injection amount Qp is excessively smaller than the requested injection amount Qo, the amount of urea water injected into the exhaust gas passage 31a is smaller than the amount of corresponding $NO_x$ in the exhaust gas. In other words, less urea water is injected into the exhaust gas passage 31a than what is necessary for purifying the $NO_x$ in the exhaust gas. As such, the $NO_x$ in the exhaust gas may not be sufficiently purified. In the present embodiment, the abnormalities such as the over-injection (i.e., excess) and the under-injection (i.e., deficiency) of urea water can be determined by using the injection stop speed Ns.

Specifically, when the pump control unit makes an affirmative determination at S28, the pump control unit 70 sets the number M to zero at S33, and proceeds to S34. At S34, the pump control unit 70 determines whether the integrated requested injection amount ΣQo is smaller than an injection threshold value Qt. The injection threshold value Qt is an injection amount corresponding to a maximum injection amount Qmax of the injection valve 50, which is more specifically, set to an integrated injection amount by integrating the maximum injection amount Qmax of each acquisition period Te. When the pump control unit 70 makes a negative determination at S34, the pump control unit 70 determines that a consumption amount abnormality has occurred in the injection valve 50 at S36, and ends the abnormality determination process. Here, the consumption amount abnormality is an abnormality where the actual injection amount Qp is greater than the maximum injection amount Qmax.

When the pump control unit 70 makes an affirmative determination at S34, the pump control unit 70 determines at S38 whether the injection stop speed Ns is equal to or less than the speed threshold value Nt. The speed threshold value Nt is a threshold value for determining the type of abnormality of the injection valve 50 based on the injection stop speed Ns. Specifically, the speed threshold value Nt is an injection stop speed Ns that is acquired in the previous abnormality determination process, and is updated as the speed threshold value Nt (i.e., at S32). When the pump control unit 70 makes a negative determination at S38, i.e., "NO," the pump control unit 70 determines at S40 that a stuck open abnormality has occurred in the injection valve 50, and ends the abnormality determination process. Here, a stuck open abnormality is an abnormality where the injection valve 50 is stuck (e.g., remains) in the open state and the injection valve 50 cannot close due to such abnormality. For the stuck open abnormality, the actual injection amount Qp is excessively greater than the requested injection amount Qo.

When the pump control unit 70 makes a positive determination at S38, i.e., "YES," the pump control unit 70 determines at S42 that a stuck fully-closed abnormality has occurred in the injection valve 50, and ends the abnormality determination process. Here, the stuck fully-closed abnormality is an abnormality where the injection valve 50 is stuck (e.g., remains) in a fully-closed state and the injection valve 50 is not opened. For the stuck fully-closed abnormality, the actual injection amount Qp becomes excessively smaller than the requested injection amount Qo.

When the pump control unit 70 makes a negative determination at S10, i.e., "NO," the process proceeds to S44. At S44, the pump control unit 70 performs a preparation process for handling an abnormality in an unattended vehicle after the operation of the engine 30 is stopped.

Figure 5:
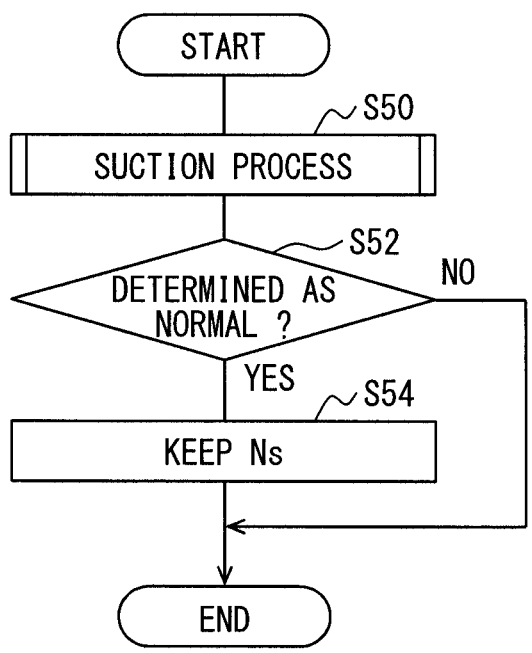
FIG. 5 is a flowchart of a preparation process.

FIG. 5 is a flowchart of the preparation process at S44 in FIG. 3. Upon starting the preparation process, the pump control unit 70 performs a suction process at S50. In the suction process, the pump control unit 70 rotates the pump 44 in a reverse direction to suck the urea water in the supply pipe 42 back into the tank 40. The suction process at S50 may prevent situations where urea water remains in the supply pipe 42 while the vehicle is left unattended, by discharging the urea water in the supply pipe 42 back into the tank 40. Unattended may mean after the vehicle engine 30 is turned off and the vehicle operator leaves the vehicle to sit with its engine off. As such, the suction process at S50 may help to limit and/or prevent situations where the supply pipe 42 freezes and bursts due to urea water freezing in the supply pipe 42.

At S52, the pump control unit 70 determines whether the speed threshold value Nt has been updated during the current operation of the engine 30. When the pump control unit 70 makes a negative determination at S52, i.e., "NO," the pump control unit 70 ends the preparation process shown in FIG. 5 and the abnormality determination process shown in FIG. 3. On the other hand, when the pump control unit 70 makes an affirmative determination at S52, i.e., "YES," the pump control unit 70 proceeds to S54. An affirmative determination at S52 means that the speed threshold value Nt has been updated during the most recent operation of the engine 30 before the engine 30 is turned off. That is, the engine 30 is turned off after an update of the speed threshold value Nt due to a normality determination at S30 in FIG. 3.

At S54, the pump control unit 70 stores the speed threshold value Nt in memory (e.g., a substantive, non-transitory storage device such as a RAM), and ends the preparation process shown in FIG. 5 and the abnormality determination process shown in FIG. 3. As a result, the speed threshold value Nt is stored during the period where the engine is off (i.e., stopped) until the time when the engine 30 is next started (i.e., when the operation of the engine 30 resumes). In the present embodiment, when the pump control unit 70 performs the process at S54, the pump control unit 70 may be referred to as a "keeper," because the pump control unit 70 keeps the speed threshold value Nt in memory until the vehicle engine 30 is started again.

Figure 6:
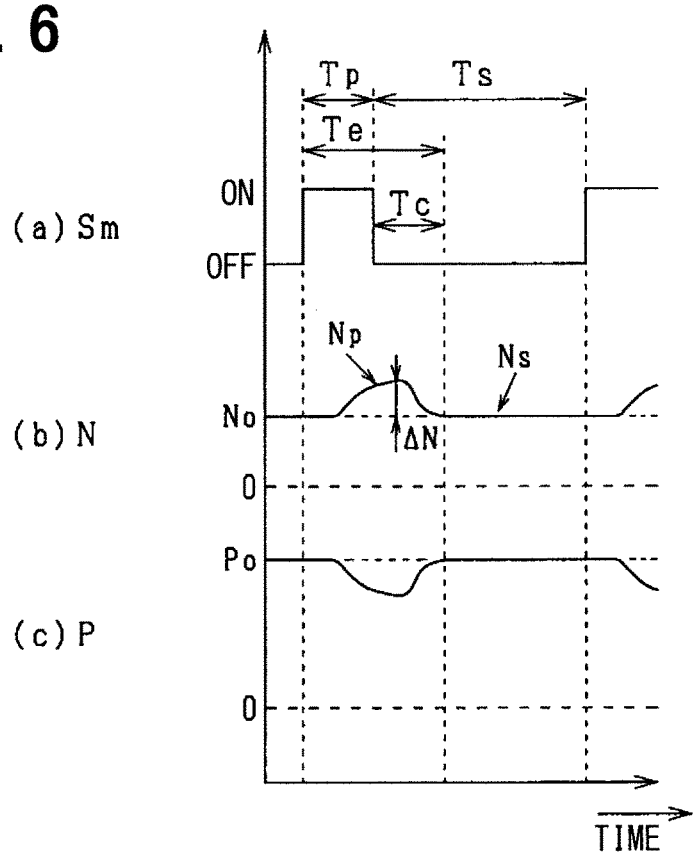
FIG. 6 is a transition diagram of a rotation speed when the injection amount is small.
Figure 7:
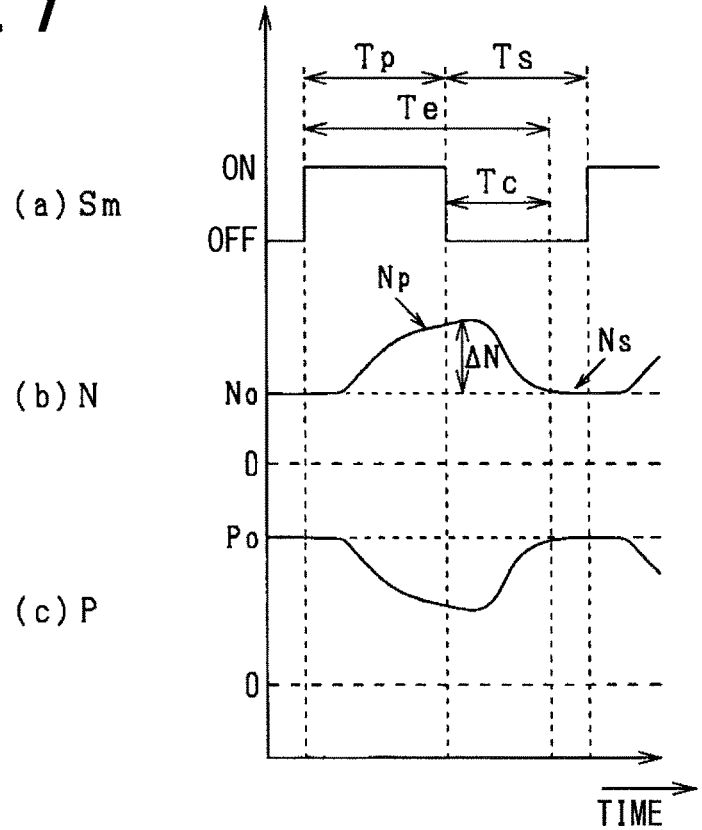
FIG. 7 is a transition diagram of a rotation speed when the injection amount is large.

Subsequently, an example of the abnormality determination process is described with reference to FIGS. 6, 7, 8, 9, and 10. FIG. 6 shows a transition of the rotation speed N when the injection amount Q is small. FIG. 7 shows a transition of the rotation speed N when the injection amount Q is large.

In both FIGS. 6 and 7, (a) shows a transition value of the drive signal Sm, (b) shows a transition of the rotation speed N, and (c) shows a transition of the pressure P in the supply pipe 42.

When the urea water is injected by the injection valve 50 during the injection period Tp of the drive signal Sm, the pressure P in the supply pipe 42 decreases.

In order to compensate for the pressure drop during the injection, the pump discharge amount is increased by the pressure feedback, and accordingly the rotation speed N increases. As shown in FIG. 6, when the injection period Tp is short, and the actual injection amount Qp of the injection valve 50 is small, the decrease amount of the pressure P is small, and the increase amount ΔN of the rotation speed N is also small. On the other hand, as shown in FIG. 7, when the injection period Tp is long, and the actual injection amount Qp of the injection valve 50 is large, the decrease amount of the pressure P is large, and the increase amount ΔN of the rotation speed N is also large. That is, there is a correlation between the actual injection amount Qp of urea water by the injection valve 50, and the increase amount ΔN of the rotation speed N. As such, the actual injection amount Qp can be calculated from the increase amount ΔN of the rotation speed N. As shown in FIGS. 6 and 7, the predetermined period Tc during which the increase amount ΔN of the rotation speed N is acquired is set to increase in duration in proportion to the injection period Tp. That is, as the injection period Tp becomes longer, so does the predetermined period Tc.

Figure 8:
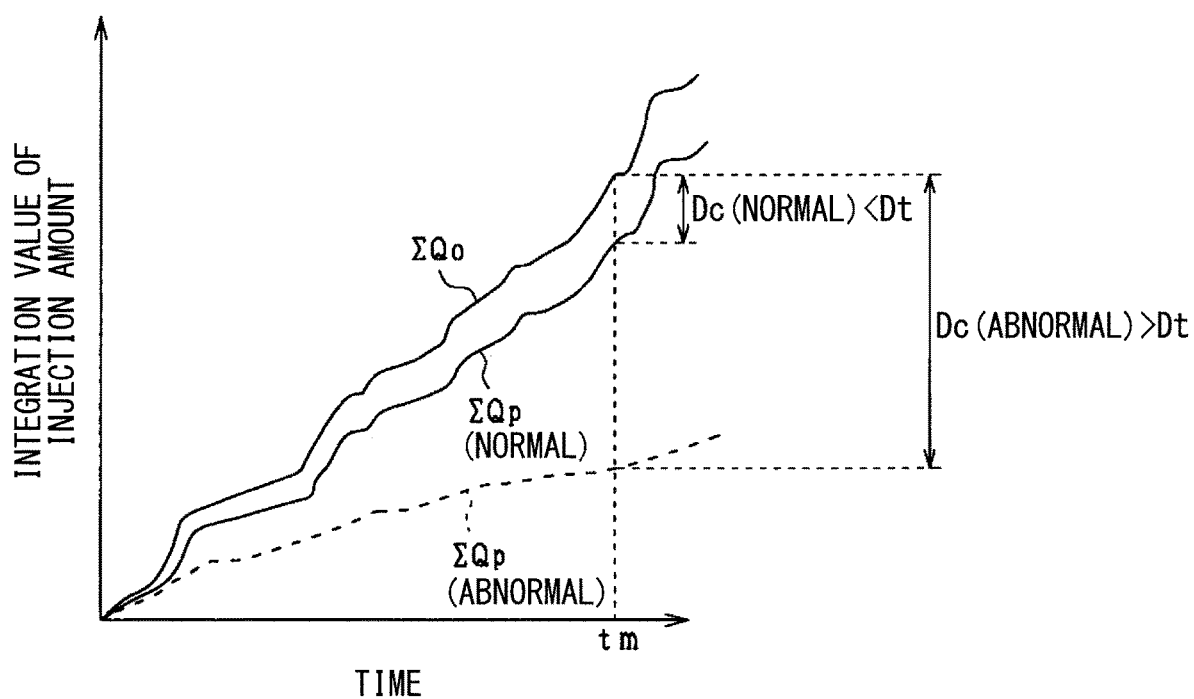
FIG. 8 is a transition diagram of an integration value of the actual injection amount and an integration value of a requested injection amount.

FIG. 8 shows the transition of the integration value of the actual injection amount Qp and the integration value of the requested injection amount Qo. In an initial state before an expected change due to the aging of the injection valve 50, the actual injection amount Qp is substantially equal to the requested injection amount Qo. However, as the injection valve 50 starts to age (i.e., the time increases) a noticeable difference occurs between the actual injection amount Qp and the requested injection amount Qo due to the aging of the injection valve 50. As such, the consumption amount deviation Dc is caused between the actual injection amount Qp integration value and the requested injection amount Qo integration value. As indicated by the actual injection amount Qp shown as a solid line in FIG. 8, when there is no abnormality in the injection valve 50, the consumption amount deviation Dc is smaller than the difference threshold value Dt at time tm corresponding to the number M.

On the other hand, as indicated by the actual injection amount Qp shown as a broken line in FIG. 8, when the injection valve 50 has an abnormality (e.g., a fault, a malfunction), the consumption amount deviation Dc becomes greater than the difference threshold value Dt at time tm. As such, the presence or absence of an abnormality in the injection valve 50 can be determined based on the actual injection amount Qp.

Figure 9:
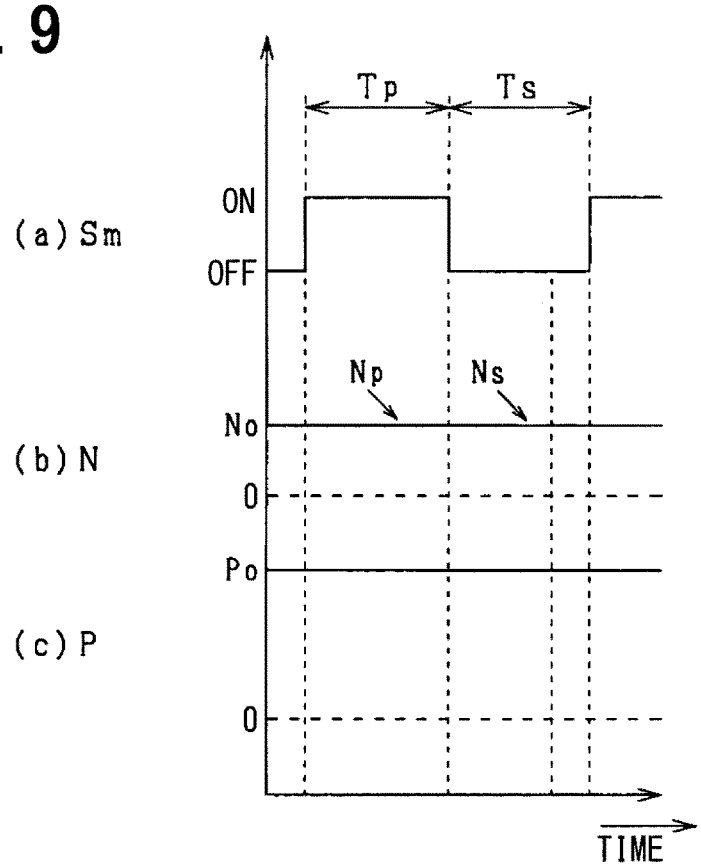
FIG. 9 is a transition diagram of a rotation speed when the injection valve has a stuck open abnormality.
Figure 10:
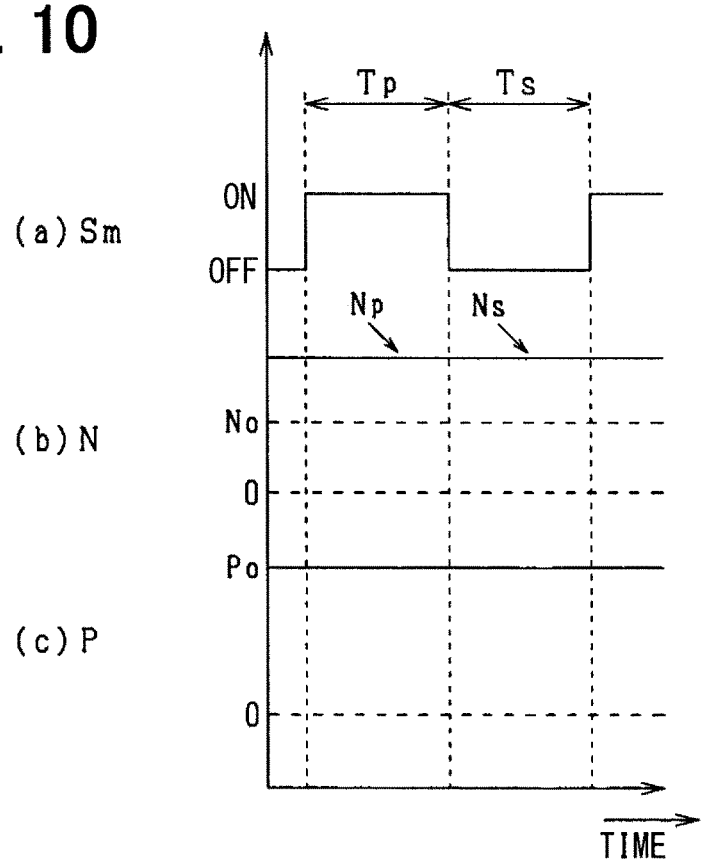
FIG. 10 is a transition diagram of a rotation speed when the injection valve has a stuck fully closed abnormality.

FIG. 9 shows the transition of the rotation speed N for an injection valve 50 having a stuck open abnormality. FIG. 10 shows the transition of the rotation speed N for an injection valve 50 having a stuck fully-closed abnormality. In FIGS. 9 and 10, (a) shows the transition value of the drive signal Sm, (b) shows the transition of the rotation speed N, and (c) shows the transition of the pressure P in the supply pipe 42.

As shown in FIG. 9, when the stuck fully-closed abnormality occurs in the injection valve 50, since the injection valve 50 is closed in the injection stop period Ts, the injection stop speed Ns becomes the reference speed No. On the other hand, when the stuck open abnormality occurs in the injection valve 50, as shown in FIG. 10, the injection valve 50 is not closed in the injection stop period Ts. As such, due to the constant injection of urea water by the injection valve 50, the injection stop speed Ns rises to a value higher than the reference speed No to maintain the pressure P of the supply pipe 42. That is, the injection stop speed Ns varies depending on the type of abnormality caused in the injection valve 50. As such, it is possible to determine the type of abnormality caused in the injection valve 50 based on the injection stop speed Ns.

The following effects may be achieved by the present embodiment.

As described above, there is a correlation between the injecting state of the urea water by the injection valve 50 and the change in the rotation speed N. Therefore, in the present embodiment, by determining the abnormality of the injection valve 50 based on the rotation speed N, it is possible to properly determine the abnormality of the injection valve 50.

Specifically, in the present embodiment, because there is a correlation between (i) the actual injection amount Qp of the injection valve 50 indicating the injecting state of the urea water by the injection valve 50, and (ii) the increase amount ΔN of the rotation speed N indicating the change of the rotation speed N, specific abnormalities of the injection valve 50 can be determined based on the injection speed Np and the injection stop speed Ns. Therefore, it is possible to accurately determine the abnormality of the injection valve 50 by eliminating the influence of the injection stop speed Ns, as compared with abnormality determinations where the abnormality of the injection valve 50 is determined only by the injection speed Np.

More practically, the increase amount ΔN of the rotation speed N is calculated from the injection speed Np and the injection stop speed Ns, and the actual injection amount Qp of the injection valve 50 is then calculated based on the direct relationship between the increase amount ΔN of the rotation speed N and the actual injection amount Qp of the injection valve 50. Since the difference between the actual injection amount Qp and the requested injection amount Qo is correlated with the abnormality of the injection valve 50, it is possible to determine the abnormality of the injection valve 50 based on the actual injection amount Qp.

In the present embodiment, the presence or absence of abnormality in the injection valve 50 is determined by using a direct relationship between the injecting state of urea water by the injection valve 50 and the rotation speed N. Therefore, it is possible to improve the accuracy of the abnormality determination compared to cases where the abnormality of the injection valve 50 is determined by using the indirect relationship between the pump duty ratio Du and the rotation speed N.

In the present embodiment, since an abnormality in the injection valve 50 can be more accurately determined and since a specific abnormality of the injection valve 50 can be identified, a vehicle user can be notified of the abnormality (e.g., via a warning light, an audio warning, a display of the abnormality on a vehicle display) to facilitate and prompt an accurate repair of the exhaust gas purification system 10. As a result, it is possible to prevent and/or limit the vehicle from being used in a state where the exhaust gas purification system 10 is broken (e.g., has an abnormality, fault, malfunction) and the exhaust gas is not purified.

In the present embodiment, when calculating the increase amount $\Delta N$ of the rotation speed N of the target acquisition period Te, by using the injection stop speed Ns acquired in the injection stop period Ts immediately before the target acquisition period Te, the increase amount $\Delta N$ is calculated. The change due to aging of the injection valve 50 is reflected in the injection stop speed Ns acquired in the immediately preceding injection stop period Ts. Therefore, it is possible to properly determine the abnormality of the injection valve 50 in a state that reflects the aging of the injection valve 50.

In the present embodiment, the type of abnormality in the injection valve 50 is determined based on the injection stop speed Ns. The injection stop speed Ns varies depending on the kind of abnormality occurring in the injection valve 50, such as the stuck fully-closed abnormality, or the stuck open abnormality. Therefore, based on the injection stop speed Ns, it is possible to properly determine the type of abnormality in the injection valve 50.

In the present embodiment, when the consumption amount deviation Dc based on the difference between the request injection amount Qo and the actual injection amount Qp is smaller than the difference threshold value Dt, the injection stop speed Ns used for calculating the actual injection amount Qp is set as the speed threshold value Nt.

Since the injection stop speed Ns in the injection stop period Ts varies with the aging of the injection valve 50, the speed threshold value Nt is also updated for comparison with the injection stop speed Ns. If the speed threshold value Nt is updated to an abnormal value, it is difficult to properly determine the type of abnormality in the injection valve 50 by using the speed threshold value Nt.

In the present embodiment, when the consumption amount deviation Dc is smaller than the difference threshold value Dt, the pump control unit 70 determines that the injection valve 50 is normal. Therefore, the injection stop speed Ns used for calculating the actual injection amount Qp of the injection valve 50 determined as normal is also evaluated as normal.

Therefore, by updating the injection stop speed Ns as the speed threshold value Nt, it is possible to properly update the speed threshold value Nt.

In the present embodiment, when the operation of the engine 30 is stopped after the speed threshold value Nt is updated, the speed threshold value Nt is stored unchanged in memory during the stop period.

An abnormality of the injection valve 50 may occur during the stop period. In such case, if the speed threshold value Nt is set after the engine 30 is next started, the speed threshold value Nt may be set to an abnormal value corresponding to the abnormality of the injection valve 50. In such a case, it is not possible to properly determine the type of abnormality in the injection valve 50 by using the speed threshold value Nt.

In the present embodiment, when the operation of the engine 30 is stopped after the speed threshold value Nt is updated, the speed threshold value Nt is kept unchanged over the stop period. Since the speed threshold value Nt has been updated, it is evaluated, assuming here that the unchanged speed threshold value Nt is normal. Therefore, even if an abnormality is caused in the injection valve 50 during the stop period, it is possible to appropriately determine the type of the abnormality after the occurrence of the abnormality by using the speed threshold value Nt that has been determined to be normal before the occurrence of the abnormality.

In the present embodiment, an abnormality of the injection valve 50 is determined by using the integrated actual injection amount $\Sigma Qp$ acquired by integrating the actual injection amount Qp in the M pieces/times in the acquisition period Te.

The increase amount $\Delta N$ of the rotation speed N is smaller than the reference speed No. Specifically, the increase amount $\Delta N$ is about 20 to 30 rpm, whereas the reference speed No is about 1200 rpm. Therefore, when the actual injection amount Qp for only one acquisition period Te is used, the determination of an abnormality in the injection valve 50 based on data (e.g., Qp) from only one period Te may not be proper.

In the present disclosure, the abnormality of the injection valve 50 is determined by using the integrated actual injection amount $\Sigma Qp$ acquired by integrating the actual injection amount Qp in the M pieces/times in the acquisition period Te. In such manner, the abnormality determination of the injection valve 50 in the present embodiment can be more accurately and properly performed than an abnormality determination where the abnormality of the injection valve 50 is determined by using the actual injection amount Qp in one acquisition period Te.

The present disclosure is not limited to the description of the above embodiment, and may be modified as follows.

In the abnormality determination process, the process of determining the type of abnormality (i.e., S34-S42 in FIG. 3) is not necessarily performed. Also, the type of abnormality to be determined is not limited, for example, only to a stuck open abnormality and a stuck fully-closed abnormality, and it is not necessary to determine a consumption amount abnormality.

An example where the injection stop speed Ns is acquired in every injection stop period Ts has been shown. However, the frequency of the injection stop speed Ns acquisition is not limited to every injection stop period Ts. For example, the injection stop speed Ns may be acquired only once during the operation of the engine 30, before the injection of urea water by the injection valve 50 is started. As such, the preset condition for acquiring the injection stop speed may be that the injection stop speed is acquired once after starting engine 30, but before the injection of the urea water by the injection valve 50.

Further, during the operation of the engine 30, the injection stop speed Ns is not necessarily acquired. For example, when the speed threshold value Nt that has been updated during the previous operation of the engine 30 is kept (i.e., S54 in FIG. 5), such a speed threshold value Nt may be used as the injection stop speed Ns during the current operation of the engine 30. In such case, it may not be possible to determine the type of abnormality by using the injection stop speed Ns.

In the abnormality determination process, the integration of the actual injection amount Qp (i.e., S24 in FIG. 3) need not necessarily be performed. In such case, an absolute value of the difference between the actual injection amount Qp and the requested injection amount Qo is the consumption amount deviation Dc. Also, it is possible to increase or decrease the number of times of integration for integrating the actual injection amount Qp.

Although an example using the injection amount Q in the calculation of the consumption amount deviation Dc is shown, the rotation number $\Sigma N$ may also be used in such calculation. Specifically, a requested rotation speed $\Sigma No$ of the injection valve 50 is calculated based on the current load and the rotation speed of the engine 30, and the consumption amount deviation Dc may be calculated from an absolute value of the difference between the actual rotation speed ΣNp calculated from the increase amount ΔN of the rotation speed N and the actual rotation speed ΣNo.

What is claimed is:

1. An abnormality determination device for use in an exhaust gas purification system that is disposed in an exhaust gas passage of an internal-combustion engine, the exhaust gas purification system including an injection valve for injecting a liquid reducing agent to a $NO_x$ purification catalyst that purifies $NO_x$ in an exhaust gas, and a pump for pressurizing and supplying the reducing agent to the injection valve via a reducing agent passage, the abnormality determination device comprising:
   an acquisition section configured to acquire a rotation speed of the pump as an injection time rotation speed when the injection valve is injecting the reducing agent; and
   a determiner configured to determine whether the injection valve has an abnormality based on the injection time rotation speed, wherein
   the determiner is further configured to determine whether the injection valve has an abnormality based on a difference between a requested injection amount of the injection valve and an actual injection amount calculated from the injection time rotation speed;
   the acquisition section is further configured to acquire a rotation speed of the pump as a no-injection time rotation speed when the injection valve is in an injection stop state; and
   the determiner is further configured to calculate the actual injection amount from an increase amount of the injection time rotation speed relative to the no-injection time rotation speed.

2. The abnormality determination device of claim 1, wherein
   the injection valve is configured to perform an injection and to stop the injection repeatedly at a preset cycle,
   the acquisition section is further configured to acquire the injection time rotation speed after a start of the injection by the injection valve, and to acquire the no-injection time rotation speed before the start of injection of the injection valve, and
   the determiner is further configured to calculate the actual injection amount from the increase amount of (i) the injection time rotation speed after the start of the injection of the injection valve relative to (ii) the no-injection time rotation speed before the start of the injection of the injection valve.

3. The abnormality determination device of claim 1, wherein
   the determiner is further configured to compare the no-injection time rotation speed with a preset speed threshold value when the determiner determines that the injection valve has an abnormality, and wherein
   the determiner is further configured to determine that the injection valve has a stuck open abnormality that inhibits a closure of the injection valve, when the no-injection time rotation speed is greater than the preset speed threshold value, and wherein
   the determiner is further configured to determine that the injection valve has a stuck closed abnormality in which the injection valve stays closed, when the no-injection time rotation speed is equal to or less than the preset speed threshold value.

4. The abnormality determination device of claim 3, wherein
   the acquisition section is configured to repeatedly acquire the no-injection time rotation speed according to a preset condition, and
   the acquisition section includes an updater configured to update the speed threshold value by the no-injection time rotation speed for use by the determiner to determine that the injection valve has no abnormality.

5. The abnormality determination device of claim 4 further comprising:
   a keeper configured to keep the speed threshold value over a stop period of the internal-combustion engine extending from a stop of the internal-combustion engine to a subsequent start of the internal combustion engine, when an operation of the internal-combustion engine is stopped after the update of the speed threshold value.

6. The abnormality determination device of claim 1, wherein
   the injection valve is configured to perform an injection and to stop the injection repeatedly, and wherein
   the determiner is further configured to determine whether the injection valve has an abnormality based on a difference between (i) an integration value of the requested injection amount from each of a plurality of the injecting states and (ii) an integration value of the actual injection amount from each of the plurality of the injecting states.

7. An abnormality determination device for use in an exhaust gas purification system that is disposed in an exhaust gas passage of an internal-combustion engine, the exhaust gas purification system including an injection valve for injecting a liquid reducing agent to a $NO_x$ purification catalyst that purifies $NO_x$ in an exhaust gas, and a pump for pressurizing and supplying the reducing agent to the injection valve via a reducing agent passage, the abnormality determination device comprising:
   a pump control unit configured to
      acquire a rotation speed of the pump as an injection speed when the injection valve is injecting the reducing agent,
      determine whether the injection valve has an abnormality based on the injection speed,
      calculate a requested injection amount of the injection valve based on a current load and rotation speed of the engine,
      calculate an actual injection amount from the injection speed, and
      determine whether the injection valve has an abnormality based on a difference between the requested injection amount of the injection valve and the actual injection amount.

8. The abnormality determination device of claim 7, wherein
   the pump control unit is further configured to
      acquire a rotation speed of the pump as an injection stop speed when the injection valve stops injecting the reducing agent, and
      calculate the actual injection amount from an increase amount of the injection speed relative to the injection stop speed.

9. The abnormality determination device of claim 8, wherein
   the pump control unit is further configured to control the injection valve to perform an injection of the reducing agent and to stop the injection of the reducing agent repeatedly at a preset cycle, acquire the injection speed after a start of the injection by the injection valve, and to acquire the injection stop speed before the start of injection by the injection valve, and calculate the actual injection amount from
(i) the increase amount of the injection speed after the start of the injection by the injection valve relative to
(ii) the injection stop speed before the start of the injection of the injection valve.

10. The abnormality determination device of claim 8, wherein the pump control unit is further configured to
determine that the injection valve has an abnormality, and compare the injection stop speed with a preset speed threshold value when the pump control unit determines that the injection valve has abnormality, and wherein the pump control unit determines that the injection valve has a stuck open abnormality when the injection stop speed is greater than the preset speed threshold value, and wherein the pump control unit determines that the injection valve has a stuck closed abnormality when the injection stop speed is equal to or less than the preset speed threshold value.

11. The abnormality determination device of claim 10, wherein the pump control unit is further configured to
repeatedly acquire the injection stop speed based on a preset condition, and update the speed threshold value with the injection stop speed, and wherein the preset condition includes one or more of:
the pump control unit acquires the injection stop speed before acquiring the injection speed in an acquisition period subsequent to an injection stop period where the injection stop speed is acquired, or the pump control unit acquires the injection stop speed after the internal-combustion engine is started and before the injection of the reducing agent by the injection valve, and wherein the pump control unit uses the speed threshold value updated with the injection stop speed to determine that the injection valve has no abnormality.

12. The abnormality determination device of claim 11 further comprising:

the pump control unit is further configured to store the speed threshold value, when the internal-combustion engine is stopped after the pump control unit updates the speed threshold value.

13. The abnormality determination device of claim 7, wherein the pump control unit is further configured to
control the injection valve to perform an injection of the reducing agent and to stop the injection of the reducing agent repeatedly, and determine whether the injection valve has an abnormality based on a difference between
an integration value of the requested injection amount from each acquisition period, and
an integration value of the actual injection amount from each acquisition period.

* * * * *